March 7, 1972  P. S. S. DAWSON  3,647,633
APPARATUS FOR THE CONTINUOUS PHASED CULTURING OF CELLS
Original Filed Nov. 22, 1967  12 Sheets-Sheet 1
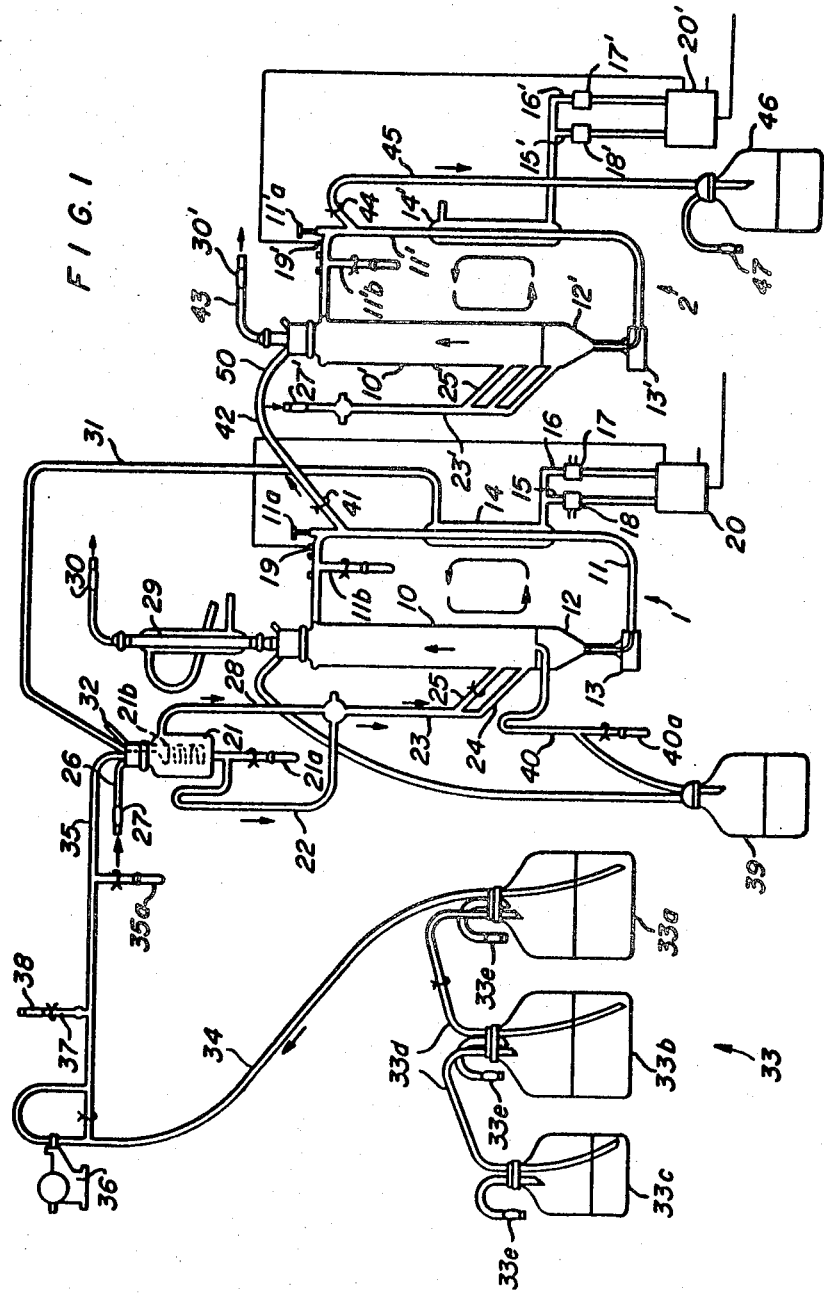
INVENTOR
PETER S. S. DAWSON
BY *Smart & Biggar*
ATTORNEYS.

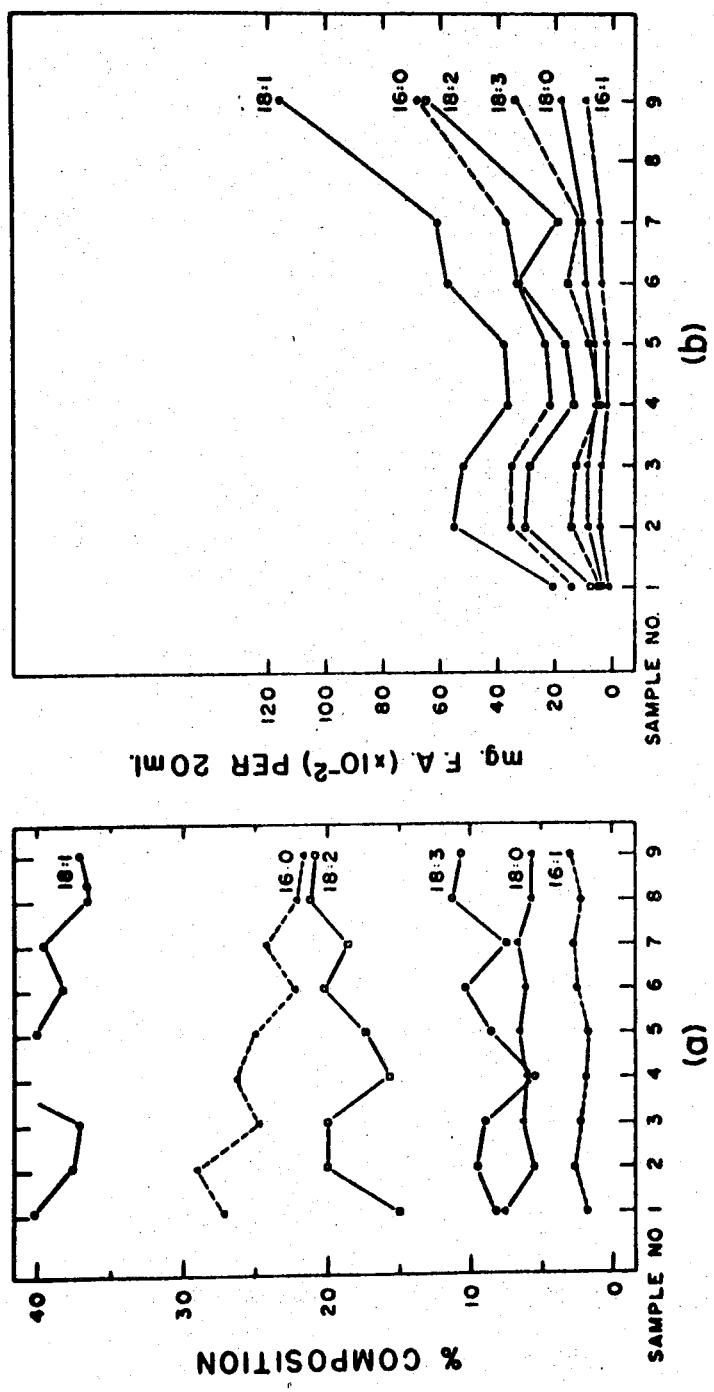

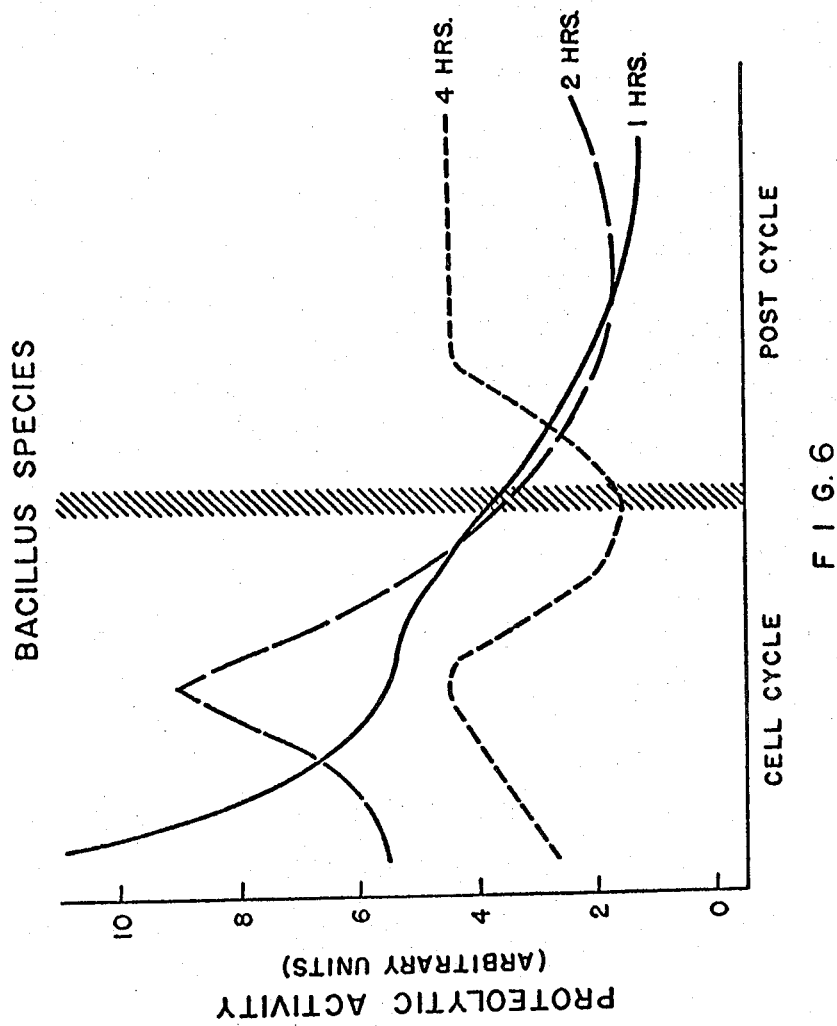

United States Patent Office 3,647,633
Patented Mar. 7, 1972

3,647,633
APPARATUS FOR THE CONTINUOUS PHASED CULTURING OF CELLS
Peter S. S. Dawson, Saskatoon, Saskatchewan, Canada, assignor to Canadian Patents and Development Limited, Ottawa, Ontario, Canada
Original application Nov. 22, 1967, Ser. No. 689,231, now Patent No. 3,419,473, dated Dec. 31, 1968. Divided and this application Aug. 16, 1968, Ser. No. 810,397
Int. Cl. C12b 1/20
U.S. Cl. 195—139          3 Claims

ABSTRACT OF THE DISCLOSURE

A method of improving or maintaining the phasing of cells in a cell culture by growing the cell culture at a predetermined rate in a nutrient medium which is present in an amount sufficient only for the cells in the cell culture to complete their cycle and at the doubling time of the cell culture i.e. the time when from 70 to 90% of the cells are on the point of dividing, adding further cell culture medium to at least a portion of the cell culture such that the cells have sufficient medium for completion of a further cycle.

This is a division of application Ser. No. 689,231 filed Nov. 22, 1967 and, now U.S. Pat. 3,419,473.

BACKGROUND OF THE INVENTION

Field of the invention

The present invention relates to the cultivation of cells such as micro-organisms e.g. bacteria, yeasts, moulds and cells of higher tissues such as plant or animal cells. In particular the present invention relates to the production of phased cultures of such cells desirably on a continual basis.

By "phased cell cultures" or "phased cultures" as used herein are meant cell cultures in which at least a large majority of the cells usually at least 70-80%, are in phased condition of growth, i.e. are at an identical stage of growth over their cell cycle.

Description of prior art

It is known that in the growth of cell cultures in nutrient media the rate of growth of the cells is determined to a large extent by the environment in which the cultures are grown. Of the factors of said environment it is the medium which largely controls and fixes the rate of growth of the cells the other factors such as aeration, pH, and temperature being of secondary importance.

Two basic procedures are known for growing cell cultures in a nutrient medium namely a batch method and a continuous method.

In the batch method a cell culture is grown in a nutrient medium at constant volume, i.e. in a given amount of nutrient medium. Usually there is excess nutrient medium present over and above that which is necessary for the maximum growth rate of the cell culture but as the nutrient medium is used by the division and growth of the cells the composition of the nutrient medium continuously changes with the result that the growth rate of the cells after the excess of nutrient medium is used up also continously changes, i.e. the medium becomes continuously more deficient in the nutrients required by the cells for growth until one of the nutrient components is essentially removed when the rate of growth of the cells drops towards zero. As in all stages of the batch method the growth rate of the cell culture is completely transient, except perhaps for a short period during the exponential phase of growth, it is extremely difficult to investigate the cells, the metabolism of the cells and the products produced by the cells, i.e. the metabolites.

In the continuous method of growthing the cell culture such as is disclosed in United States Pat. No. 2,822,319 the composition of the nutrient medium and the number of cells in said medium is maintained substantially constant and as such the growth rate of the cells in the culture is also maintained essentially constant. Further the growth rate of the cells can be preselected by the predetermination, usually empirically, of the composition of the medium necessary for the particular rate of growth required. In the continuous method, which is desirably carried out in a chemostat, nutrient medium is continuously added at a constant volumetric rate to a culture in a culture vessel which culture is homogeneously maintained with the nutrient medium and simultaneously therewith equal volumes of culture are withdrawn from the culture vessel as by overflow of said culture therefrom. Growth thus occurs at constant volume, under constant conditions of composition of the culture medium and with a constant number of cells in the culture medium. Thus a condition of equilibrium is attained which can go on indefinitely provided that the culture conditions are maintained. The ratio of rate of flow of the medium to the volume of culture in the culture vessel controls the equilibrium by imposing a controlled growth rate on the culture. Due to the control of the rate of growth provided by the continuous method there is a constant rate of growth of the cells with the attendant constant metabolism of the cells and metabolite formation.

However, in the aforesaid two methods there is no control whatsoever as to the phasing of the division of the cells and due to the fact that the cells of the culture naturally divide in somewhat random distribution according to the Gaussian statistical law the cells in both methods are completely random in their division throughout the culture. Thus although in the continuous method the overall cell metabolism and the metabolites produced by the cells and the growth rate of the cells is constant, investigation of the cells and the cell metabolism and the harvesting of the cell products in relation to the progress of development or growth of a cell, i.e. of the cell cycle is still not readily achievable due to the fact that at any particular times the cell culture forms an average over the whole cell cycle and as such any particular stage in the cell cycle cannot be investigated nor can the products produced at one particular stage in the cell cycle be readily harvested. Thus in both cultures produced by the batch and continous methods due to the randomization of the cells during the cell cycles any components present to a varying extent over the life cycle of each cell becomes averaged over the whole culture and significant transient unit increases are levelled over the whole system. Cultures produced by the continuous process due to the consistent rate of growth of the cells can operate to give a higher constant level.

Attempts have been made to form phased cell cultures but these methods are extremely limited in their application and have only been applied to the batch method which itself is limited with regard to the investigation of the cells due to the transient nature of the rate of growth of the cells. The cultures so produced are generally termed synchronous or synchronized cultures depending upon whether the process effected is considered to be a forced treatment or an extension of the normal growth process. In the method of producing synchronized cultures forced treatments are carried out upon the culture such as widening temperature variations, inhibitor addition and nutrient removal which arrests the growth of the cells at the conclusion of their cycle and when the forced treatment is removed from the cell culture a simultaneous spurt of new division takes place. By this means it has been found that it is possible to cause the cells to divide essentially in phase over the following two or three generations before complete randomization of division occurs again. In the method of producing synchronous cultures the normally grown culture is fractionated by a physical method such as filtration or centrifugation and a fraction of small cells is separated out and this serves as the population for synchronous growth. It is found that complete randomization is again predominant within three to five generations.

Thus heretofore only continuous cultivation of randomized cell populations or batch cultivation of temporary synchronized or synchronous cell populations for a very limited number of cycles have been effected which do not lend themselves to the investigation of the cells nor the harvesting of the by products of the cell cycle.

SUMMARY OF INVENTION

The present invention provides a continual production of cells in a phased condition of growth whereby the cells so produced may be used at any stage in this phased condition for metabolic processes, extraction of the cells or the obtaining of products without affecting the purity or phasing of the culture whatever the growth rate that is chosen or used.

The process of the present invention is predicated on the recognition that a cell has a pattern of behaviour over its growth cycle controlled by its environment and characteristic for specific conditions which can be experimentally determined and reproduced by the process. Thus the process is predicated on the recognition that the cell cycle changes with growth rate and that a cell does not possess a fixed life span with respect to time as has often heretofore been assumed in the literature and further the changes arising from variations in the cycle apply to all the cells in the culture and not as has often heretofore been considered from a change in the proportion of active cells of fixed activity, i.e. life span in the culture. Thus whereas in the prior processes it has been recognized that one can control the growth rate of the cells by means of the culture medium the precise method of control has not been realized and the change of cell cycle with composition of the nutrient medium has not been realized as the essential step in the control of growth rate. Thus it has now been found that a pattern of metabolism is recognizable as occurring during the growth cycle of the cells, i.e. over the reproduction or doubling time of the cells, that is characteristic of the medium, of the growth rate and of the environmental conditions. This has been recognized mainly on the basis of empirical analysis of intracellular metabolites and of deoxyribonucleic acid and ribonucleic acid and protein fractions taken at intervals during the cell cycle. In effect therefore applicants have found that the amount of nutrient present which hithertofore has been recognized to determine the rate of cell growth, i.e. determines the time taken for the cell to complete their cycle and divide, is now used by the cells in a particular fashion suited to their cyclic metabolism and not in a constant manner as hithertofore assumed, and for a particular reproduction time a cell may be considered to require a unit supply of nutrient that is utilized by the cell in this particular fashion.

Applicants have thus found that it is possible to improve or maintain the phasing of a cell culture by brewing the cell culture at a predetermined rate in a nutrient medium which is present in an amount sufficient only for the cells to complete their cycle and at the reproduction time of the cell culture adding further cell culture medium to at least a portion of the cell culture such that the cells have sufficient medium for completion of a further cycle.

As aforesaid it is known that the cells naturally divide in a random distribution according to the Gaussian statistical law and as such a large majority of the cells, i.e., at least 70–80% thereof divided within a very small space of time. This average time is considered to be the reproduction time of the cell culture and this reproduction time for any particular cell culture in any particular medium can be controlled experimentally.

Provided that at the reproduction time there is added sufficient nutrient medium to effect a further cell cycle then in so far as further randomisation of the cell division is concerned this will be substantially eliminated. However as the cell cycle is dependent upon the composition of the nutrient medium with respect to the number of cells, in order that the subsequent reproduction time is the same as the initial reproduction time the amount of nutrient added should be the same as the amount of nutrient in the original culture medium before culturing thereof. If it is not then a different cell cycle will occur with a different reproduction time and accordingly a different metabolism of the cell will occur and different by-products from the cell will result. Hence the crucial requirement for phased growth is that each cell should receive and consume a certain constant amount (or ration) of nutrient during its cell cycle, this amount is appropriate for and dependent upon the reproduction time used. In most cases one cell requires one ration and yields two cells: that is, in practice one volume of culture usually receives one volume of medium. If the volume of culture is tripled, i.e., two rations of nutrient are supplied, control of growth is thereby eased and the cells grow more quickly using more than one ration to do so, this leaves less than one ration for the now double population to use. When the next dosing takes place the culture is not balanced and the numbers in phase are decrased disproportionately. However, it is possible by the present invention to maintain adequate phasing of the cells if one volume of culture receives three volumes of nutrient medium every two reproduction times. This alternative method of operation will not give such a tight control of phasing as the normal procedure described above, as a certain randomisation will increase in the second cycle and of course at the next addition of nutrient three quarters of the culture will need to be removed.

While the majority of organisms produce two during the cell cycle, there are others which produce more than two; Tetrahymena for example gives four. The process of the present invention is equally applicable to such organisms. In more general terms if an organism produces $n$ cells at its reproduction then it will require $n$ rations of nutrient for the next cycle, or to maintain an early controlled phasing system, reduction of the culture volume V to $V/n$ at the reproduction time followed by addition of an equal volume $(V/n)$ of nutrient medium, the whole being made up to the original volume (V) with water. For example:

(A) Phased culture:
1 cell→$n$ cells—per cycle
at end of cycle: $n$ cells in culture volume (V)
i.e., one cell in $V/n$, add medium for this cell$=(1/n +1/n)V$, this gives a decrease in volume for the system. Make up to volume (V), i.e., add water $$\left(\frac{n-2}{n}\right) \cdot V$$

then $$V = V\left(\frac{1}{n}+\frac{1}{n}\right)+V\left(\frac{n-2}{n}\right)$$

and contains one cell to growth through the following cycle, i.e., 1 cell→$n$ cells—at end of cycle. This repeats.

(B) Culture required for processing, etc.: $(n-1)$ rations of nutrient must be added to the portion of culture $$\left(\frac{n-1}{n}\right)V$$

removed, at the end of the cycle, from the culture vessel used for phasing the growth. This culture is then grown in the second culture vessel until it reaches that point in the cell cycle when it is harvested for use; the addition of water is not necessary in this stage.

DESCRIPTION OF PREFERRED EMBODIMENTS

The cell cultures for use in the process of the present invention may be an uphased cell culture or more preferably a phased cell culture. If the starting cell culture is an unphased cell culture then the process of the present invention improves the phasing of the culture i.e. reduces the randomization of division of the cells. In this case in order to obtain a phased cell culture it is necessary to repeat the halving of the culture after addition of nutrient medium, a plurality of times and further to add nutrient medium such that the volumes of the medium and the cell culture are equal whereby the same cell cycle with consequent equal reproduction or doubling time results.

When using phased cell cultures as the starting material, phased cell cultures are automatically produced and one half may then be used for the production of further phased cell culture and the other half for investigation, analysis or the harvesting of metabolites.

In particular it is most convenient and practical, just before the reproduction or doubling time, to add the nutrient medium to the cell culture preferably in an equal volume and homogeneously mix the same therewith and then immediately divide the cell culture into two equal volumes. By this means it is possible to continually produce a phased cell culture having precisely the same properties and cell cycle as a previously produced cell culture which may then be readily used for the investigation of its cells or its products, intracellularly and extracellularly, intact or disrupted, so that the cells, metabolic intermediates, or products may be obtained in a specified condition repeatedly in each cycle of the process.

In a preferred embodiment of the present invention therefore there is provided a process for the continual production of phased cell cultures which comprises growing a cell culture in a nutrient medium at a predetermined rate of growth, the amount of nutrient medium being sufficient only for each cell to complete its cycle and at the doubling time of said culture dividing the said culture exactly in half and adding further of said nutrient medium such that each of said halves has precisely the same volume as the original cell culture. Conveniently as aforesaid the nutrient medium is added to the cell culture and homogeneously admixed therewith immediately prior to halving said culture. One half of the cell culture is then used for the production of further identical phased cell culture and the other half may be used as desired for investigation of the cell metabolism and the harvesting of metabolites therefrom as the culture passes through another identical cell cycle.

Thus as a cell passes through a cell cycle it produces different metabolites at different stages thereof. These metabolities may be only transient and subsequently converted into other products or they may be permanent. By the process of the present invention it is possible to harvest any of these desired metabolites in maximum possible yield from the cell culture. This is because in the phased cell culture 70-80% of the cells of the culture produce the particular metabolite at one particular time and providing harvesting takes place at that time the maximum yield is obtained. In contrast thereto the cell culture obtained by the conventional continuous process being random only a small proportion of the cells produce a particular metabolite at any one time and thus harvesting is difficult if not impossible particularly where the metabolite is transient. Further as each culture produced when using equal volumes of nutrient medium will be precisely the same as the last the same metabolite may be harvested from each culture. On the other hand a different metabolite can be harvested from each culture if desired merely by harvesting at a different time. In order to determine when to harvest it is only necessary to analyse the pattern of metabolite change in the cell cycle of one such phased culture and note when the desired metabolite or metabolites are produced.

The process of the present invention is however, flexible in that after producing one type of phase cell culture having a particular cycle time and metabolic pattern it is possible to produce a different phased cell culture merely by altering the composition of the nutrient medium or the periodicity of the nutrient addition or changing the incubation temperature of the culture. By this means one can readily obtain other metabolites and other cells for investigation.

The process of the present invention is applicable to the production of fine chemicals and biochemicals as well as the production of natural compounds such as enzymes and complex materials produced transiently during cell growth such as messenger ribonucleic acid which are likely to be required for chemotherapeutic, prophylactic, manufacturing and other uses. These materials are at present overlocked, neglected or unobtainable in the diluted amounts in which they occur when conventional procedures are used for growing the cells. The process is operable on any scale required within the technological considerations normally applicable to the growth of micro-organisms and cells.

While in the continual production of a phased cell culture for subsequent use thereof it is desirable to divide the culture into two equal halves at the doubling time and add further nutrient medium such that each of said halves has precisely the same volume as the original cell culture. When the object is only to maintain or improve the phasing of the cell culture, division of the culutre at the doubling time is not necessary and it is only necessary to add sufficient nutrient medium at the doubling time for the cells in the culture to complete a further cycle and preferably to add an equal volume of nutrient medium so that the cells pass through the same cycle. However it will be readily seen that over a number of cycles the volume of the cell culture will increase as a geometric progression with the resultant necessity to add large volumes of nutrient medium at the doubling time after only a few cycles. Therefore in the interests of economy it is desirable when only improving or maintaining the phasing of the cell culture for subsequent use thereof to retain only a portion suitably not more than a half and at the doubling time add an equal volume of nutrient medium to this portion and discard the remainder. By doing this of course the amount of cell culture ultimately present for subsequent use may be smaller than required but this can readily be rectified by allowing the volume to increase in the geometric progressions referred to above by using the whole amount of the cell culture for a few cell cycles. Further it is not necessary to remove the portion of the cell culture all at once at the doubling time as it may be removed in a plurality of stages before the doubling time.

The process of the present invention has applicability to cultures of any free living cells whether micro-organism or tissue cells. Typical cell culture which may be mentioned are those of yeasts such as *S. cereyisiess, S. rouxii, S. magolise*, bacteria such as *Strep. bovis, A. aerogenes, A. suboxydens, Pseudomonad sp.* and others such as *Streptomyces venenuleas* and in particular *Candida utilis*, as well as plant cells and animal cells.

It is envisaged that in order to upgrade the number of cells in the phased cell culture so as to have from 90 to 100% of the cells in phase the known procedures which have been applied to batch cultures for the production of synchronous or synchronized culture such as temperature variations and inhibitor addition be applied to the phased culture at the doubling time which will effectively extend the doubling time and allow more cells to divide while stopping the further growth of the divided cells.

The nutrient medium may be a chemically undefined nutrient medium but is preferably a chemically defined nutrient medium. Thus if it is desired to investigate the cells with regard to their metabolism it is essential to known the nature of the compounds initially present but if it is desired only to obtain metabolites from the phased cell culture the nature of the nutrient medium is not of first importance.

Thus it will be seen that the method of supplying the medium decides the manner and nature of growth of the cell culture. In particular batch growth gives a transient and randomized characteristic to the cells which are changing throughout and continuous growth gives a constant growth rate in a randomised population of cells and a steady state of averaged values for the equilibrium conditions used. On the other hand phased growth according to the present invention gives a steady state population with the cells in phase and undergoing a patterned cycle of change characteristic for the growth rate over the cycle time.

Thus in the phased culture technique of the present invention the growth rate fixes the pattern of metabolism for the cell cycle and repeats this every doubling time so that by using a suitable growth rate a particular metabolic pattern may be obtained. The changes over the cell cycle can be analysed in a preceding cycle and subsequently used as desired in any subsequent cycle of the same cycle time, either at one specific point in the cycle in all the subsequent cycles or at different points in the subsequent cycles. Further it is possible by changes in growth rate to change the pattern over the cycle so that after a period of running at one cycle, another growth rate and cycle may be used as desired.

By making changes in the medium or by using other media further changes in a like manner can be obtained, or further varied by temperature change.

DESCRIPTION OF DRAWINGS

The present invention will be further illustrated by way of the accompanying drawings in which:

FIG. 1 is a diagrammatic representation of an apparatus for carrying out the process according to one embodiment of the present invention; and FIGS. 2 to 6 are various graphs and records obtained in the example following;

FIG. 2F presents graphs showing changes in (a) percentage of fatty acid composition and (b) the total fatty acids of the *C. utilis* cell culture growing as in FIGS. 2A to 2E;

FIG. 4 presents gas liquid chromatograms traces of the *C. utilis* cell culture grown as in FIGS. 3A and 3B but in a glycerol medium with a cycle time of 6½ hours;

FIG. 5 shows the changes in activity of enzymes 1, 2, 3 and 4 in the degradation sequence during a cell cycle of 140 minutes doubling time for Pseudomonas species on phenylacetic acid and FIG. 6 shows the changes in proteolytic activity during cell cycle and post cycles of a Bacillus species growing in phased growth at 1, 2 and 4 hours doubling times.

Figure 2A:
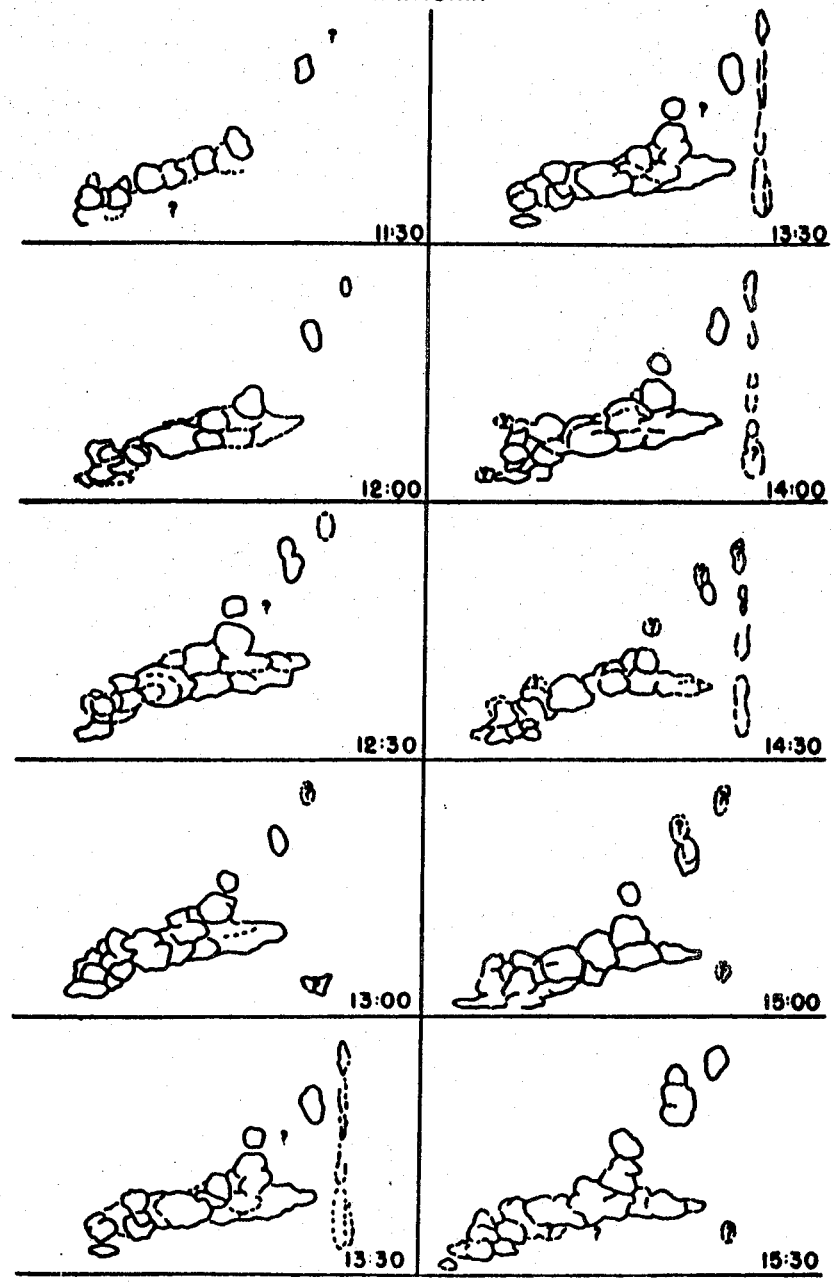
FIGS. 2A to 2E present sequences of two divisional chromatograms obtained from a *C. utilis* cell culture growing at a cycle time of 4 hours 15 minutes in a glucose medium according to the process of the present invention.
Figure 2B:
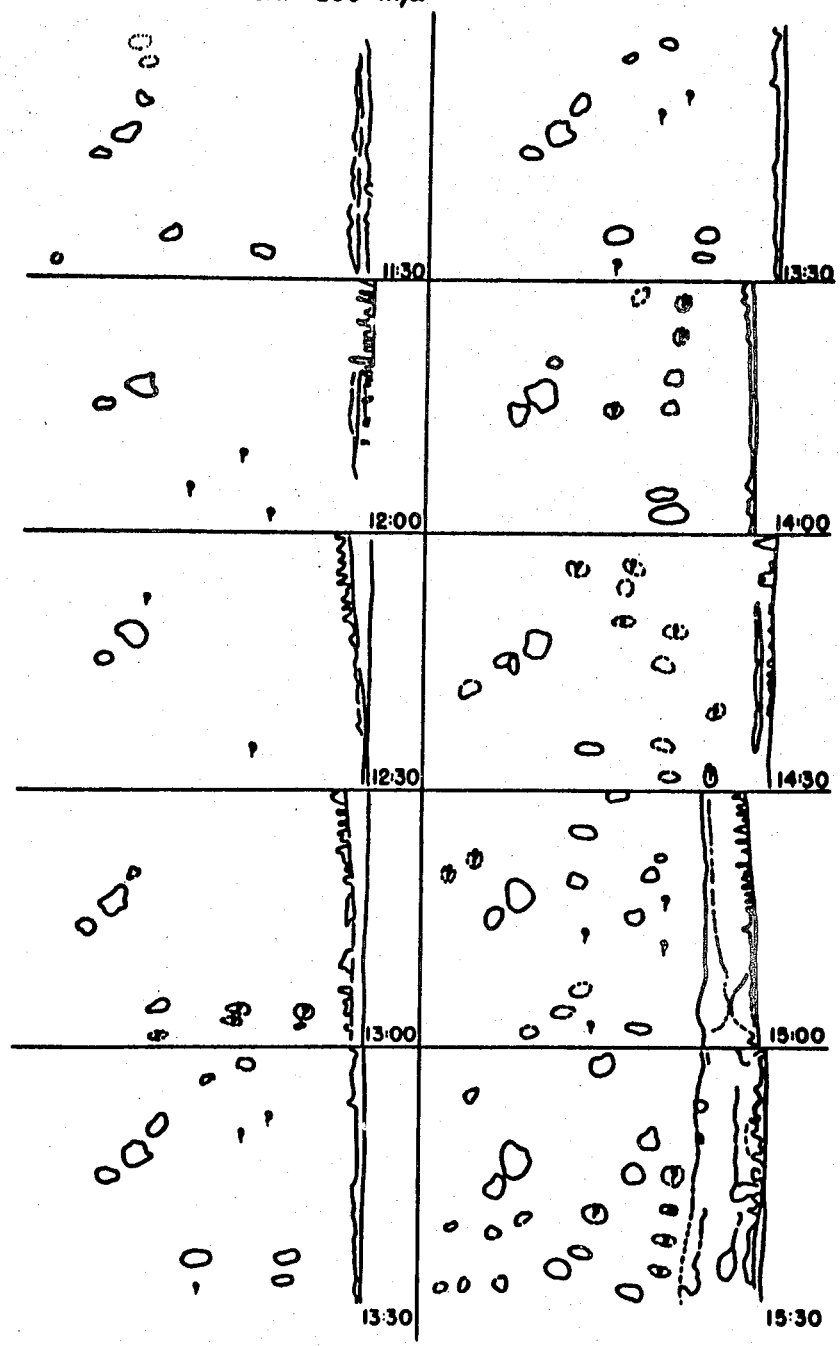
Figure 2C:
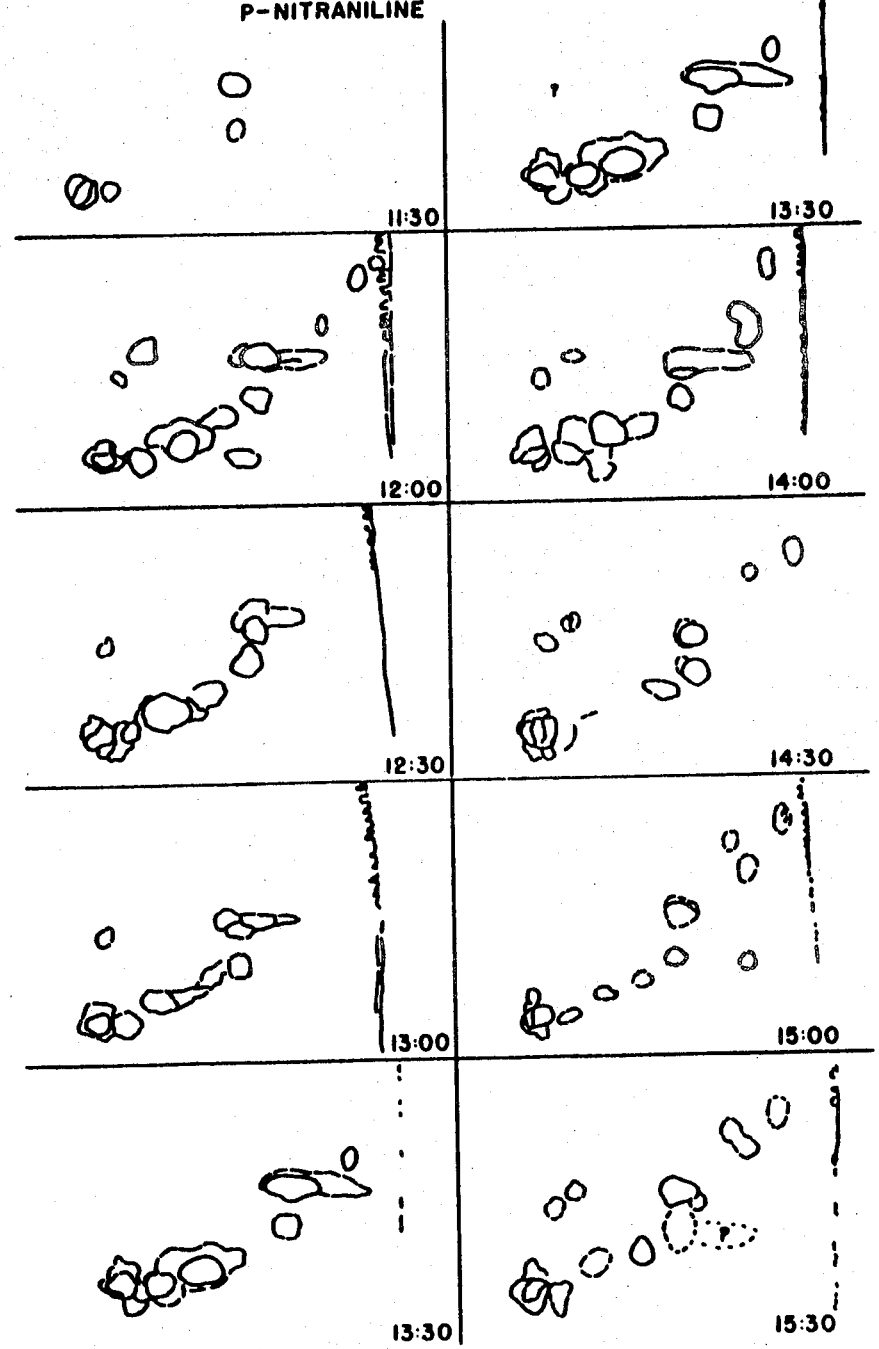
Figure 2D:
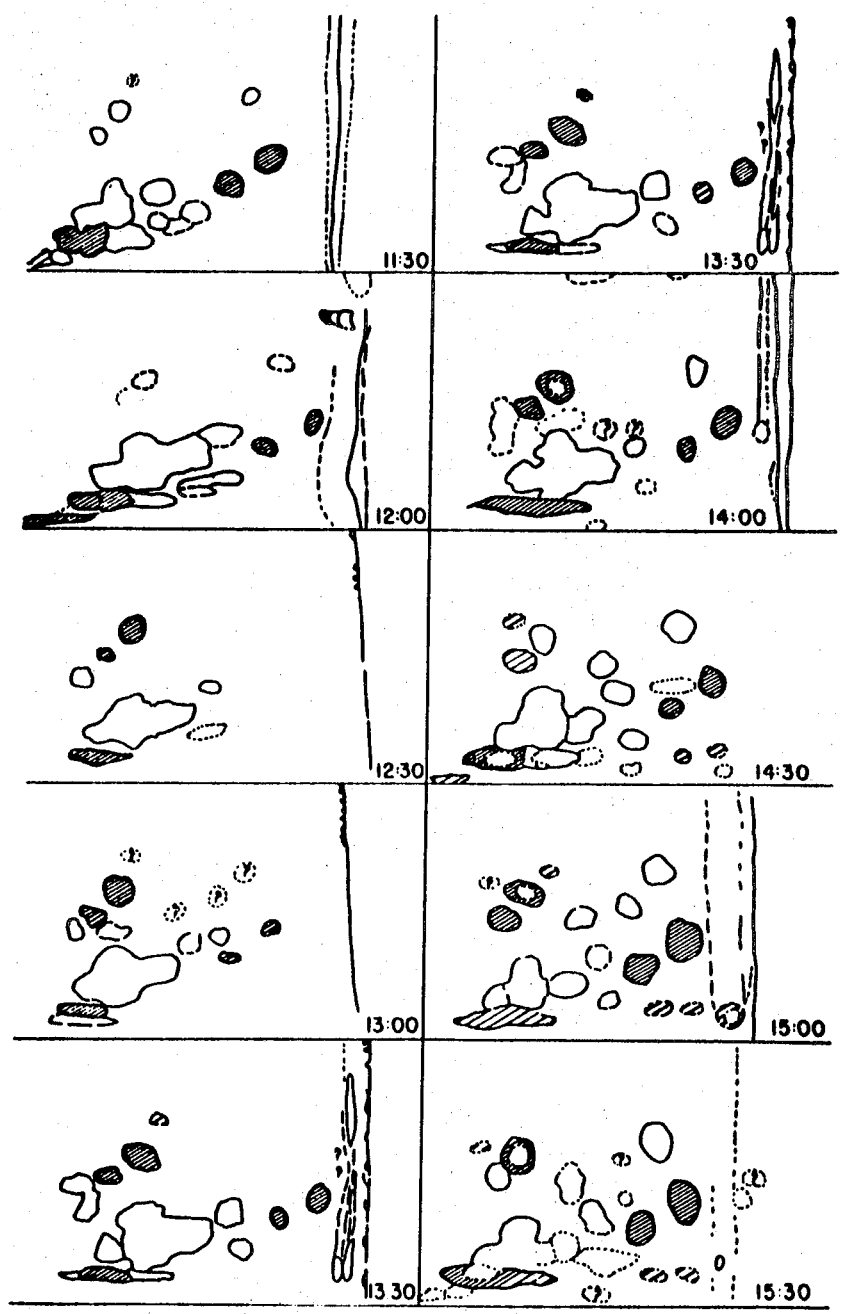
Figure 2E:
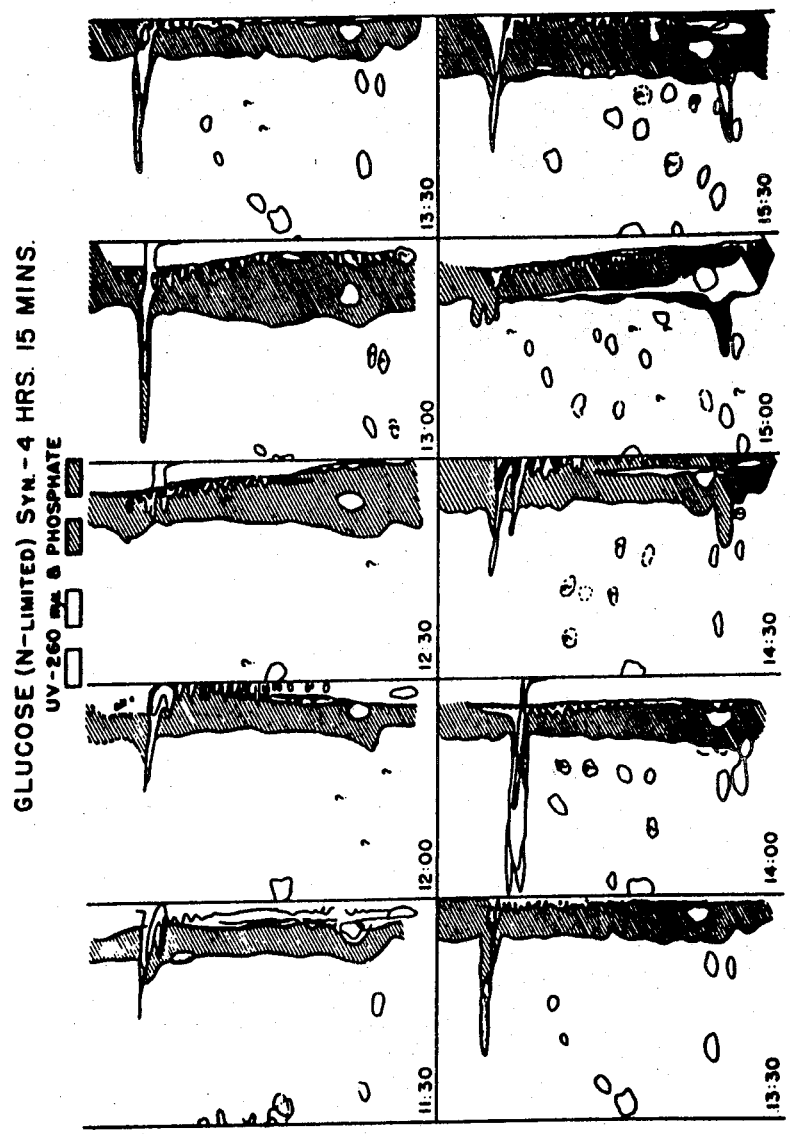

The apparatus shown is a modified form of that described in an article "A Continuous Flow Culture Apparatus" by P. S. S. Dawson, pages 671 to 687 of "Canadian Journal of Microbiology," volume 9 (1963).

The apparatus as shown in the figure comprises basically a phasing unit 1 and a processing unit 2.

The phasing unit 1 is formed of a cyclone column 10 and a recirculating limb 11 which form a loop around which a mixture of cell culture and nutrient medium 12 is circulated whereby the homogeneity thereof is maintained. The cyclone column is a vertical column having a conical funnel exit at the base and a cyclone inlet at the top. The circulation of the mixture 12 is effected by means of a circulating pump 13. During such circulation the mixture 12 enters the pipe of the cyclone column 10 and passes down the side walls to the bottom thereof where it is recirculated by the pump in the direction shown by the arrows. The cyclone column 10, the recirculating limb 11 and the pump 13 are essentially the same in construction as disclosed on page 674 of the aforesaid article.

The temperature of the recycling mixture 12 in the phasing unit 1 is maintained essentially constant by means of a water jacket 14 disposed around the recirculating limb 11 which water jacket is supplied with a mixture of hot and cold water through lines 15 and 16, the relevant proportions of the hot and cold water being controlled by solenoid valves 17 and 18 actuated by a thermistor probe 19 in the recirculation limb 11 through a relay 20. The temperature of the mixture 12 in the phasing unit 1 is ascertained by means of a thermometer 11a disposed in the recirculation limb 11. Again as on page 674 of the aforesaid article the upper horizontal portion of the recirculation limb 11 may carry a number of side arms to carry further sensing elements of various control elements such as pH electrodes or opposing fixtures such as a sampler 11b or inoculator. The relay 20, solenoid valves 17 and 18, thermometer 11a, sampler 11b and thermister 19 are essentially the same as those disclosed in the aforesaid article.

The phasing unit 1 is supplied with fresh medium at the doubling time from a dosing vessel 21 through an automatic syphon 22 nutrient medium-gas supply line 23 and side arms 24 and 25 on the cyclone column 10. Gas such as air or nitrogen is continuously passed to the cyclone column 10 from a supply (not shown) through a line 26 containing sterile filter 27, the dosing vessel 21, a line 28, and the medium-gas supply line 23 and the side arms 24 and 25. The gas is continuously exited from the column 10 through a water vapour condenser 29 and sterile filter 30. The presence of the condenser 29 as will be seen from the aforesaid article on page 676 is to remove water condensed from the effluent gas to prevent condensation forming in the filter 30 and a subsequent back pressure into the cyclone column 10. The inflow and outflow of the gas are measured by flow meters.

So as to maintain the nutrient medium in the dosing vessel 21 and the mixture 12 in the phasing unit 1 at the same temperature the water issuing from the water jacket 14 on the recirculating limb 11 is led through a line 31 to a coil 21b disposed in the dosing vessel 21 and eventually out of said coil through line 32 to waste. The dosing vessel 21 is the same as the chiller unit disclosed on page 679 of the aforesaid article except the coil as aforesaid is connected to the water jacket 14 and not to a refrigeration unit. The dosing vessel 21 is also supplied with a sampler 21a. The connections between the top of the cyclone column 10 and the condenser 29 are the same as disclosed in the figure on page 673 of the aforesaid article and the samplers used throughout the apparatus are the same as shown on page 678 of the article.

Nutrient medium is continuously supplied to said dosing vessel 21 from a medium supply 33 through lines 34 and 35 by means of a pump 36 the line 35 containing a flow meter 37 and a sterile filter 38. The medium supply 33 comprises a reservoir 33a the nutrient medium in said reservoir being continually replenished from medium supply bottles 33b and 33c which are connected by syphons 33d to each other and are in contact with the atmosphere through sterile filters 33e. The flow meter 37, pump 36 and medium supply vessels 33 are the same as those disclosed on pages 674 and 675 of said article.

When the nutrient medium in the dosing vessel 21 reaches a predetermined level, which time is of course exactly the doubling time of the cells in the mixture 12, the automatic syphon 22 delivers the medium in said dosing vessel 21 to the cyclone column 10 and the medium mixes with the mixture 12 in the column 10 as it is being dosed into the column 10, and when this addition is complete (and also the mixing) one-half of the diluted mixture 12 is either passed from the column 10 to a harvest bottle 39 through an automatic syphon 40 or a clamp 41 in a line 42 is manually opened whence an equal volume of diluted mixture 12 passes to the upper end of a cyclone column 10' of the processing unit 2. Precisely to where the mixture 12 is led depends upon the phasing of the mixture 12 in the phasing unit 1. Thus if the mixture 12 in the phasing unit 1 is formed from a phased culture and the object of the process is obtaining products therefrom then the mixture will be led off through line 42 into the processing 2. If on the other hand the mixture 12 in the phasing unit 1 is formed from unphased cells the object being to obtain a phased culture the mixture is led off into the bottle 39 through the syphon 40 for the product in being unphased will have no particular use. The syphon 40 is also provided with a sampler 40a.

The processing unit 2 is very similar in construction to the phasing unit 1 and comprises a cyclone column 10', recirculating limb 11', the pump 13' the cell culture nutrient medium mixture 12' circulating therearound in the direction shown by the arrows. The recirculating limb 11' is similarly provided with a water jacket 14' to control the temperature of the mixture 12' the flow of hot and cold water through lines 15' and 16' being controlled by solenoid valves 17' and 18' actuated by thermistor 19' through a relay 20'. However the water exiting from the jacket 14' passes to waste. Gas such as air or nitrogen passes to the mixture 12' in the cyclone column 10' from a source not shown via a sterile filter 27', line 23' and side arms 25' and exits from the column 10' through line 43' and sterile filter 30'. The recirculating limb 11' is precisely the same as in the phasing unit 1 and contains thermometer 11a' and the sampler 11b'.

When the pattern of metabolism over the cycle is to be investigated serial samples for analysis are withdrawn from the sampler 11b at regular intervals.

When the product is to be harvested from the processing unit 2 the culture 12' is passed by opening a clip 44 through a line 45 to a harvest vessel 46 connected to the atmosphere through a sterile filter 47.

As will be seen the apparatus is provided at various places with samplers so that the medium or culture composition at any particular part of the apparatus may be sampled and in addition to samplers 11b, 11b', 21a and 40a a further sampler 35a is provided in line 35.

For operation the empty apparatus is sterilized by autoclaving, suitably the apparatus is broken down into various sections to effect such autoclaving. The autoclaving technique is similar to that disclosed on page 682 of the aforesaid article. The apparatus is then assembled and the nutrient medium which has been first sterilized in a similar manner to that disclosed on page 683 of the aforesaid article is introduced into the cyclone column 10 to the circulation volume.

An inoculum is prepared by growing a suitable batch culture until the exponential phase of growth is reached. The cell culture is then inoculated into the circulating medium by one of the several aseptic techniques disclosed on page 684 of the aforesaid article.

The medium flow from the medium supply 33 to the dosing vessel 21 is then started, the rate of flow determining the doubling time of the process. Thus a purely arbitrary doubling time is chosen, for instance six hours and medium through the lines 34 and 35 to the dosing vessel 21 is regulated accordingly such that after every six hours the nutrient medium in the dosing vessel 21 is automatically discharged through the syphon 22 to the cyclone column 10, the cell culture in the mixture 12 will then assume a rate of growth consistent with such doubling time such that at the dosing time the majority of the cells in the mixture 12 are at their doubling time. Substantially simultaneously as the dosing of fresh nutrient medium into the cyclone column 10 is completed the automatic syphon 40 is actuated and a volume of mixture 12 equal to the volume of nutrient medium dosed into said cyclone is passed to the storage vessel 39. After repeated dosage of the cyclone column 10 and repeated withdrawal of equal volumes of mixture 12 every six hours the cells in the mixture 12 will become phased and this generally takes a period of a few days. If it is desired that the cells in the mixture 12 grow at a different rate then this is achieved by altering the rate of flow of nutrient medium to the dosing vessel 21 from the medium supply 33 such that a new doubling time is chosen, say four and a half hours, and the cycle of dosing of the cyclone column 10 and removal of equal volumes of mixture 12 to the vessel 39 is carried on until the cells in the mixture 12 regain their phased growth.

If the initial cell culture inoculated into the nutrient medium in the cyclone column is a phased cell culture or if the cells in the mixture 12 have achieved a phased growth it is then possible to use the mixture drawn off periodically from the cyclone column 10 for further procedures such as harvesting of particular metabolites and investigation of the cells and their products and as such the mixture 12 is withdrawn from the recirculating limb 11 through a line 42 by opening the clip 41 to the processing unit 2 where the mixture 12' is recycled around the limb 11' and cyclone column 10' by means of the pump 13', and at various intervals of time during said recirculation samples may be withdrawn from sampler 11b' and investigated with regard to the metabolism of the cells and the metabolites produced thereby. When it is decided to harvest a particular metabolite the precise time of production of that metabolite is determined from a previous cycle and at that time the recirculating mixture 12' is led off through the line 45 by opening the clip 44 to the harvesting vessel 46.

In the phasing unit reading observations are made of the temperature of the medium in the dosing vessel and of the culture as well as the dosage and doubling time and of the operating volumes of the nutrient medium and mixture 12 in the apparatus. Determinations are also made of optical density and pH of the mixture 12 immediately before and after dosing to check the problems of the apparatus.

With regard to the processing unit 2 of the apparatus as aforesaid samples of the culture are collected at intervals over the cycle and pertinent analyses are performed on these samples and photo micrography is usually used to record the characteristics of the growth. It will be readily appreciated that the mixture 12' must be withdrawn from the processing unit before the end of the cell cycle as fresh mixture 12' will be passed from the phasing unit 1 to said processing unit 2 at this particular time.

The present invention will be further illustrated by way of the following example:

EXAMPLE (I) Production of phased culture

The apparatus as shown in FIG. 1 of the acompanying drawings of a working capacity of 500 ml. was assembled and sterilised as already described. This apparatus was used to grow *Candida utilis* strain Y.900 in phased culture at 28° C. on a simple chemically defined medium of the following composition:

Glucose—30.0 grams
$MgSO_4 \cdot 7H_2O$—0.5 gram
$CaCl_2$—0.05 gram
$KH_2PO_4$—2.5 grams
$(NH_4)_2SO_4$—1.0 gram
Winzler Salts solution—10 ml.
Distilled water—1 litre The Winzler Salts solution contains per litre: $H_3PO_3$— 10 μg.; $ZnSO_4$—10 μg.; $MnCl_2$—10 μg.; $FeCl_3$—5 μg.; $CuSO_4 \cdot 5H_2O$—1 μg.; KI—1 μg. In some procedures the nutrient medium contained 30.0 grams of glycerol instead of the glucose.

500 ml. of a batch culture of *Candida utilis* strain Y.900 (N.R.R.L. Y. 900) growing on the above medium, was obtained by pooling 5 × 100 ml. shake flask cultures of 18 hours incubation, at 28° C., and added asceptically as the inoculum to the phasing unit 1 of the apparatus. Alternatively, 500 ml. of inoculum was prepared directly in a chemostat described in pages 671 to 687 of "Canadian Journal of Microbiology, volume 9 (1963)" growing *Candida utilis* strain Y. 900 on the same medium at 28° C. and operating on a residence time of six hours. In either case, after inoculation, circulation of the culture in the cyclone column 10 and recirculating limb 11 was commenced immediately, by the circulation pump 13. The temperature of the circulating culture was maintained at 28° C. by the water jacket 14. Air flow through the cyclone column 10 was adjusted to 500 ml. per minute by a flowmeter and this entered the phasing unit through the sterile filter 27 and left the unit 1 through the exit filter 30.

The nutrient medium which had been sterilized and filled into the medium reservoir 33, as previously described, was now supplied to the dosing vessel 21 by the medium pump 36 operating at a rate of 77 ml. per hour and maintained at a temperature of 28° C. by the coil 21b. After 6½ hours, this vessel 21 was emptied of the 500 ml. medium content by the operation of the self-priming syphon exit 22 and the medium thus transferred to the cyclone column 10 by way of the line 23 and arms 24 and 25. There it was mixed with the circulating culture, increasing its volume to 1,000 ml. and priming the exit syphon 40 on the column 1 as the addition was completed and 500 ml. of the circulating culture was syphoned into the harvest bottle 39. Continued operation of the medium supply pump 36 ensured the repetition of this 500 ml. medium dosage from the vessel 21 to the cyclone column 10 at regular intervals, i.e. every 6½ hours for a pumping rate of 77 ml. per hour, and a removal of 500 ml. of diluted culture immediately afterwards from the column 10 to the harvest bottle 39. The method of operation continued for four days. The eighteenth discharge from the column 10 was diverted to processing unit 2 by manual operation of clip 41 on the exit line 42 and again 500 ml. of culture was removed leaving 500 ml. of the culture circulating in phasing unit 1. The nineteenth, twentieth and twenty-first discharges from phasing unit 1 were subsequently removed by automatic discharge through syphon 40 to the harvest bottle 39, as were all subsequent discharge, except those removed for analysis or processing by manual operation of clip 41 at the time of the completion of the dosage of medium to the column 1. The twenty-second, twenty-sixth, and thirtieth harvests, and subsequently others when required, were transferred individually in the manner of the eighteenth, to processing unit 2 for analysis.

The 500 ml. culture transferred via clip 41 to processing unit 2 continued to grow under conditions identical to those existing in phasing unit 1 the culture being circulated in column 10' and recirculating limb 11' at the same rate (6 litre/min.) by the pump 13' and maintained at the same temperature (28° C.) by water jacket 14' when supplied with the same air flow rate (500 ml./min.), this air entering through filter 27' and leaving by way of exit filter 30'. At regular intervals during the cycle period (i.e. the period between dosing times) samples of the circulating culture were withdrawn from the sampler 11'b for analysis, as described hereinafter. Upon completion of the cycle the processing unit 2 was disconnected at the Luer-Lok connection 50 in line 42 for cleansing and a new sterile empty processing unit 2 substituted. The connections at connection 50 were under aseptic conditions.

The period of operation (cycle time) for both the phasing unit 1 and the processing unit 2 was the same, and corresponded with the dosage interval; i.e. for a medium flow rate of 77 ml. per hour the cycle time was 6½ hours with a culture volume of 500 ml.

Changes in operation during phased culture can be made as already described and in this example several values were investigated. To effect these changes all that was required was an appropriate alteration of the medium flow rate to the dosing vessel 21 followed by a period of adjustment by the culture to the new conditions. This period was usually found to be complete after ten dosing periods i.e. ten cycles.

In the example, after several months of operation at a cycling period of 6½ hours, i.e. at a medium flow rate of 77 ml. per hour, a change was made to a cycling period of 2 hours by adjusting the medium flow rate to the dosing vessel 21 to 250 ml. per hour. The volumes of operation (i.e. 500 ml. medium and 500 ml. culture) remained unchanged. Twenty-four hours later, i.e. 12 cycles later, manual transfers to processing unit 2 for analysis of phased cultures were made and analysis of succeeding cycles showed that phasing was attained by a repetition of a steady state pattern over the cycle as will be seen from Table II given hereinafter. Continuous operation at this new rate followed for several weeks before subsequent changes to other rates were made in their turn to follow phased growth at other cycle times. These are summarised in the following Table I.

TABLE I.—CHANGES IN CYCLE TIME—PERIODS OF ADJUSTMENT IN PHASED CULTURE

| | Medium flow rate (ml. per hour) | Stabilised after— | |
|---|---|---|---|
| | | (a) (hours) | (b) (cycles) |
| Cycle time (hours): | | | |
| 2.0 | 250 | 24 | 12 |
| 2.5 | 200 | 24 | 11 |
| 4.2 | 120 | 48 | 11 |
| 6.5 | 77 | 72 | 11 |
| 8.3 | 60 | 72 | 9 |

(II) Analysis of the phased culture 25 ml. of the culture was removed by an aseptic withdrawal from the column 10 of the phasing unit 1 by way of the sampler 11b' and aliquots of this material were used immediately for various analyses, as follows:

(a) 1 ml. was diluted with distilled water for indirect determination of the dry weight of cells by spectrophotometric determination of the optical density of the cell suspension and relating this to a calibration curve, according to conventional practice.

A wet amount of this diluted cell suspension was used to make a record of the morphology of the cells by photomicroscopy using a Zeiss photomicroscope.

Serial dilutions for direct cell counts under the microscope were made by using 1 ml. in a series of tubes containing 9 ml. distilled water; these were counted in the usual way.

(b) 20 ml. of culture was used for extraction of the cell by methods detailed hereinafter. Direct determination of the dry weight of cells were made upon washed cells as described hereinafter.

A number of samples, usually between 8 and 12—but mostly 9 or 10, were analyzed over a cycle and gave a series of results that portrayed the sequence of change over the cycle. The progress of the growth was followed (a) by analysis of the growth of the cells over the cycle and (B) by analysis of the nature of the changes in the cells over the cycle.

α. The growth of the cells of the cells in the culture was determined by measurements of the cell mass (indirect and direct values for dry weight of cells) over the cycle; and by direct counts at the beginning and the end of the cycle (i.e. of initial and final samples, just after and just before dosing). The results as will be seen from Tables II, III and IV given hereinafter established a doubling to take place during the period of the cycle, of growth as cell mass or as cell members, which was repeated cycle after cycle.

TABLE II.—PHASE—RECORDS OF PHASED GROWTH

[Daily records of growth expressed as O.D. (2/25)[1] at 45 minute intervals over the cycle—Glucose (N-limited) medium, cycle time 6½ hours]

| Date—time | Cycle | Sample | | | | | | | | |
|---|---|---|---|---|---|---|---|---|---|---|
| | | 0 | 1 | 2 | 3 | 4 | 5 | 6 | 7 | 8 |
| 19/11—8:30 | 18th | | .44 | .48 | .50 | .54 | .65 | .69 | .71 | .76 |
| 20/11—10:30 | 22nd | .43 | .45 | .48 | .51 | .55 | .65 | .69 | .72 | .76 |
| 21/11—12:35 | 26th | .44 | .56 | .48 | .52 | .55 | .66 | .68 | .72 | .75 |
| 22/11—14:35 | 30th | .43 | .45 | .47 | .53 | .54 | .66 | .68 | .72 | .75 |
| Interval (hours) | | 0 | ¾ | 1½ | 2¼ | 3 | 3¾ | 4 | 5¼ | 6 |

[1] Growth as optical density in (2/25) dilution at 600 mµ.

TABLE III.—PHASED GROWTH—CELL DRY WEIGHT[1] CHANGE OVER THE CYCLE

| Cycle time (hours) | 2.0 | 3.25 | 6.50 | 3.25 | 4.25 |
|---|---|---|---|---|---|
| Start of cycle | .20 | .30 | .43 | .24 | .33 |
| Finish of cycle | .39 | .56 | .82 | .42 | .60 |
| Medium | Glucose | | | Glycerol | |

[1] Growth an optical density in (1/25) dilution at 600 mµ.

TABLE IV.—PHASED GROWTH—GLYCEROL MEDIUM (4.25 HOURS CYCLE)

| | No.×10[4] |
|---|---|
| Cell numbers at— | |
| Start of cycle | 234 |
| Finish of cycle | 446 |

Observations of the change in morphology of the cells during the cycle showed that a majority of the cells (70–80%) were in the same stage of growth at any point of the cycle as will be seen from photo micrographic records of the cells of C. *utilis* growing aerobically in the glucose medium over the 6½ hour cycle taken at intervals of 1 hour. The predominant cell form can be outlined for each stage and the sequence shows the changes taking place in the phased culture as single cells proceed to form two cells over the cycle. More recently a phasing of from 80% to 90% has been achieved by effecting the process on a larger scale.

The doubling of the cell growth (a) and the obvious visible changes in the morphology of the cells were correlated to the metabolism over the cycle ($\beta$), by following various chemicals analyses of the cells made at different times over the cycle.

$\beta$. Briefly these were as follows: DNA (Deoxyribonucleic acid), RNA (Ribonucleic acid) and protein—as indices of macromolecular constituents; and of amino acids, nucleotides (as materials absorbing at 260 mµ), lipids and other substances, as intermediates of metabolism. The latter class, comprising compounds of smaller molecular size and originating from the wide range of the cell metabolism, were chosen as the more sensitive indicators of metabolic change, and being more accessible to analysis were more intensively examined. The components were measured by conventional procedures based upon paper, thin layer and gas-liquid chromatography, after their extraction from the cells by procedures of solvent extraction and membrane filtration—as described below.

As the cells were grown on chemically defined medium devoid of any preformed organic substrates other than glucose or glycerol, all of the metabolic components extracted from the cells were true metabolic products of the cell and not artifacts concentrated in the cell by transport and permeation of extracellular components.

(i) Extraction of cells (a) Intracellular amino acid pool (by boiling water). 20 ml. of culture was filtered under a slight negative pressure in a Millipore filtration assembly (47 mm., Type HA filter, 0.45 mµ porosity) and followed immediately with 5 ml. of ice cold distilled water to chill and wash the cells by percolation. The combined filtrates were retained for analysis and stored at $-10°$ C., or lyophilised. The cells on the filter were extracted for 5 minutes with 20 ml. boiling water, filtered under slight vacuum and washed by percolation with 10 ml. boiling water. The combined filtrates containing the extracted amino acids were made up to 35 ml., an aliquot removed for ninhydrin assay of total amino acids by the method of Yemm and Cocking (Analyst, 80, 209 (1955)) and the remainder freeze-dried and stored at $-10°$ C.

(b) Freeze-thaw extraction sequence (for preserving thermolabile compounds). 20 ml. of culture was filtered immediately upon collection from the apparatus, using a Millipore filtration assembly (47 mm., Type HA filter, 0.45 mµ porosity) and washed with 5 ml. ice cold distilled water. The filter and cells were transferred to a small chilled conical flask, 20 ml. of ice cold distilled water added, and the cells resuspended by shaking. The cell suspension was rapidly frozen in a $CO_2$-acetone mixture and allowed to thaw in the refrigerator when convenient for further extraction as follows: immediately after thawing, the flask contents were filtered through a new membrane filter (0.45 mµ porosity), washed with 10 ml. ice cold distilled water and combined filtrates made up to 35 ml. An aliquot was removed for analysis as set forth hereinafter and the remainder freeze-dried and stored at $-10°$ C. This fraction contained amino acids, nucleotide materials, phosphates and water soluble compounds.

The cell residue was extracted at room temperature with 20 ml. of isopropanol:chloroform (1:1 v./v.) mixture for 10 minutes and after filtration, in a similar manner with 10 ml. of chloroform. The combined filtrates were evaporated to dryness and stored at $-10°$ C. This constituted the lipid fraction.

The residue remaining was used for extracting nucleic acids with hot 10% TCA (trichloroacetic acid) and finally by alkali for protein as described hereinafter.

(ii) Chromatography (a) Paper chromatography. Suitable portions of the reconstituted lyophilised samples were applied to sheets of Whatman No. 1 paper; (i) for one dimensional runs, the solvent system n-butanol; acetic acid:water (60:15:25 v./v.) was used in ascending and descending techniques; (ii) for two dimensional runs, the solvent system isopropanol:hydrochloric acid:water (65:17:18 v./v.) was used in the second direction.

After drying the papers, the materials were located by the following general methods: amino acids by multi-dipping procedure of Smith ("Chromatographic and Electrophoretic Techniques," vol. I—Chromatography, 2nd edition, Heinemann, London, (1960)) or by ninhydrin dipping and subsequent spraying with ethanolic copper nitrate Kawerau, E. and Wieland, T. Nature. 168, 77 (1951)) to render the spots permanent; nucleotides, purine and pyrimidine derivatives by viewing the papers under ultra-violet illumination at 260 mµ and making photographs for permanent records: sugars and reducing compounds by the alkaline silver-nitrate method of Trevelyan, Proctor and Harrison (Nature. 166, 444 (1950)), or by the multidipping procedure of Smith as stated above;

phosphates by the method of Wade and Morgan Nature. 171,529 (1953)) as modified by Runeckles and Krotkev (Achives Biochem. Biophys. 70, 442 (1957)): and phenolic acids by the p-nitraniline spray reagent of Bray et al. (Biochem. J. 46, 271 (1950)).

(b) Thin layer chromatography was used for qualitative examination of lipid samples. Plates of silica gel (Stahl) were spotted with aliquots of the isopropanol: chloroform extracts. Neutral lipids were developed in a 10% v./v. mixture of petroleum ether in benzene, and phospholipids in 10% v./v. mixture of methanol in chloroform: the latter solvent was modified by the addition of acetic acid (1–5%) v./v. for certain samples. Spots were detected by various spray reagents, i.e. $KMnO_4$, ninhydrin, molybdate and concentrated sulphuric acids after Marinetti (Lipid Res. 3, 1 (1962)).

(c) Gas-liquid chromatography of (i) amino acids as volatile esters was made as follows: a sample containing 1–10 mg. of amino acids was added to 10 ml. isopentanol saturated with anhydrous HCl and kept on a boiling water bath for 30 minutes. The isopentanol was removed under vacuum, the residue taken up in 5 ml. of carbon tetrachloride and 100 mg. $Na_2CO_3$ (anhydrous) added, followed by 0.2 ml. of propionyl chloride. After refluxing for 30 minutes, the $Na_2CO_3$ was removed by filtration, the solvent removed by evaporation, and the sample injected onto a Gas Liquid Chromatography unit. A six foot column of 10% OF –1 (a fluorinated silicone) was used with a temperature programme of 150–250° on a 29° per minute gradient. (ii) Fatty acids were examined as follows: the isopropanol:chloroform extract obtained from the cells was washed into a 250 ml. flask and the solvent removed. The residue was transferred by ether and methanol washings into a 50 ml. saponification flask and the solvent removed. Methanol and two pellets of KOH were added and the mixture refluxed for 30 minutes. After neutralising with acetyl chloride, two drops of boron trifluoride (etherate complex) were added as a catalyst and the mixture refluxed for 30 minutes. The solvent was removed and the residue filtered into a pointed flask with three washings of "Skelly F", 1 ml. of dibutyl sebacate in chlorofrom (1 mg. per ml.) added and the solvent removed. The sample was chromatographed by gas liquid chromatography. The column was an 8 foot x 3/16 inch copper column filled with a 4:5:1 mixture of phthalate:ethylene glycol on 40–60 mesh C–22 firebrick. The temperature was 205° and gas flow 60 ml. helium per minute.

(iii) Analytical (a) Total amino acids were assayed as amino nitrogen by the ninhydrin method of Yemm and Cocking (Analyst. 80, 209 (1955)).

(b) S-adenosyl methionine and nucleotides were extracted and determined by the method of Schlenk and DePalma (J. Biol. Chem. 229, 1037, 1051 (1957)).

(c) Dry weight of cells were determined by the methods already described, i.e.

(a) indirectly by measuring the absorbance of a known dilution of the sample in distilled water, using a setting of 600 m$\mu$ and a calibration curve to relate the reading to dry weight of cells.

(b) direct determinations were made by weighting the packed cells retained by a membrane filter, after washing with distilled water and drying overnight at 60° in a vacuum oven, to constant weight.

(d) Grading cells. Photomicrographic records were made with a Zeiss photomicroscope and Agfa IFF–13 film, of wet mounts of cell suspensions taken from the serial samples. The cells were counted and scored from prints using the separation of the cells and the appearance of a bud as the criterion of individual existence.

(e) RNA was determined on the TCA extract using the orcinol method of Umbreit ("Manometric Techniques", 3rd edition, Burgess Publ. Co., Minneapolis (1957)).

(f) DNA was estimated on the TCA extract by the diphenylamine method of Burton (Biochem. J. 62, 315 (1956)).

(g) Protein was estimated by the Folin method of Lowry et al. (J. Biol. Chem. 193, 265 (1951)), or by micro-Kjeldahl using 6.25 as the conversion factor.

Using these methods, a summary of the results, pertinent as the example, follows:

(iv) Results (1) Changes in the metabolic pools during the cell cycle; i.e. of the cycle time of phased culture or of the dosing time in phasing unit 1.

A phased growth of C. utilis, growing on the glucose medium for a cycle time of 4 hours 15 minutes, and sampled at intervals of 30 minutes, produced extracts from the cells, which chromatographed on paper by the two dimensional technique, gave the five sequences shown in FIG. 2 (A–E). These show the changes that occurred, during the cycle, in several main groups of cell metabolite that are characteristics of the metabolism of a cell: these were as follows:

(i) inhydrin positive compounds (i.e. amino acids, etc.).

(ii) ultraviolet absorbing at 260 m$\mu$ compounds (i.e. nucleotides, etc.).

(iii) p-nitraniline positive compounds (i.e. phenolic acids, etc.).

(iv) Alkaline silver nitrate reacting compounds (i.e. sugar and reducing substances, etc.).

(v) phosphate compounds (i.e. phosphates, etc.).

In FIG. 2 (F) representative changes that occurred in lipid components, during the same phased growth, are shown by the changes observed in the total fatty acids and the change in percent fatty acid composition determined by gas-liquid chromatography as aforesaid.

Figure 3A:
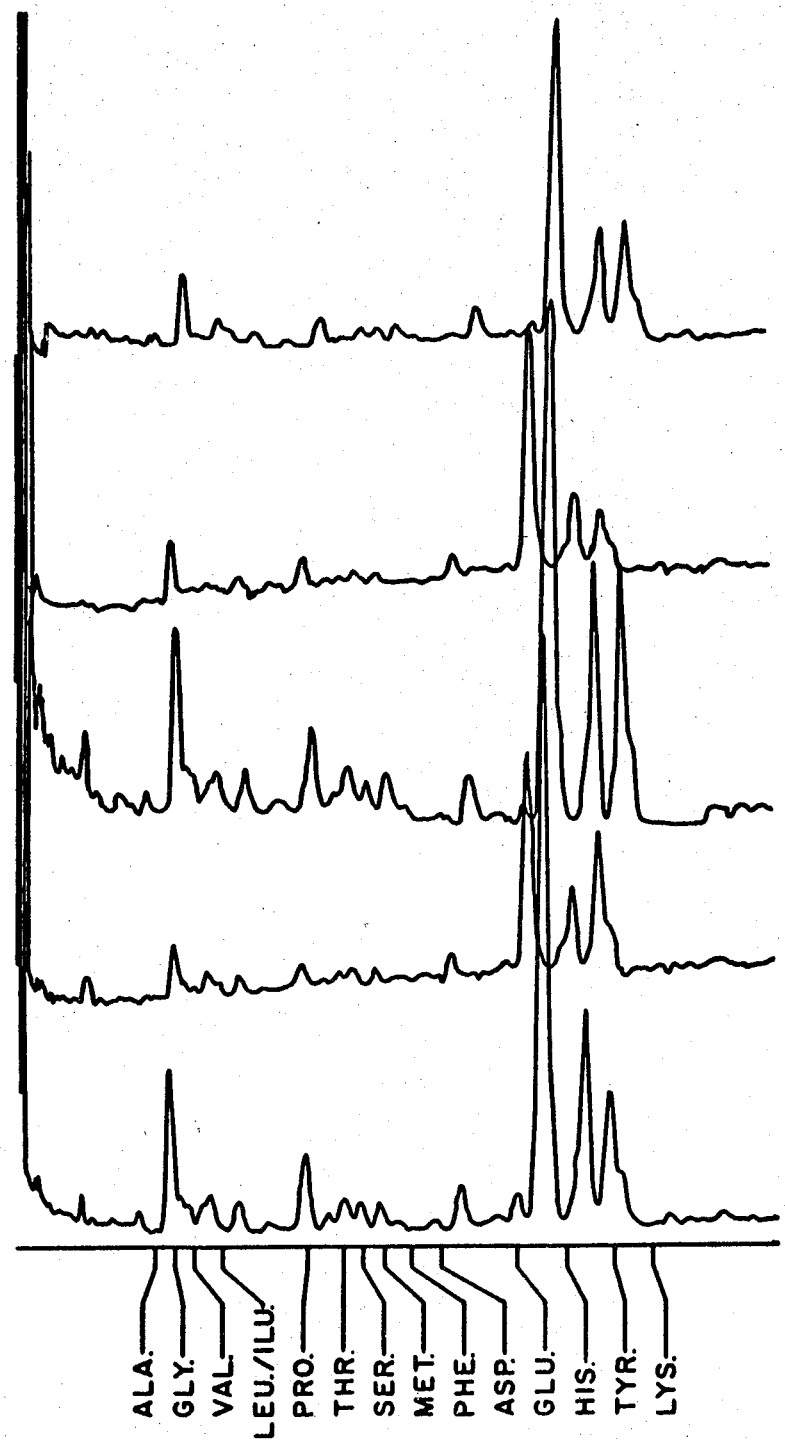
FIGS. 3A to 3B present gas liquid chromatograms traces of amino acid pools extracted from the *C. utilis* cell culture grown as in FIGS. 2A–F at cycle times of two hours and 6½ hours respectively.
Figure 3B:
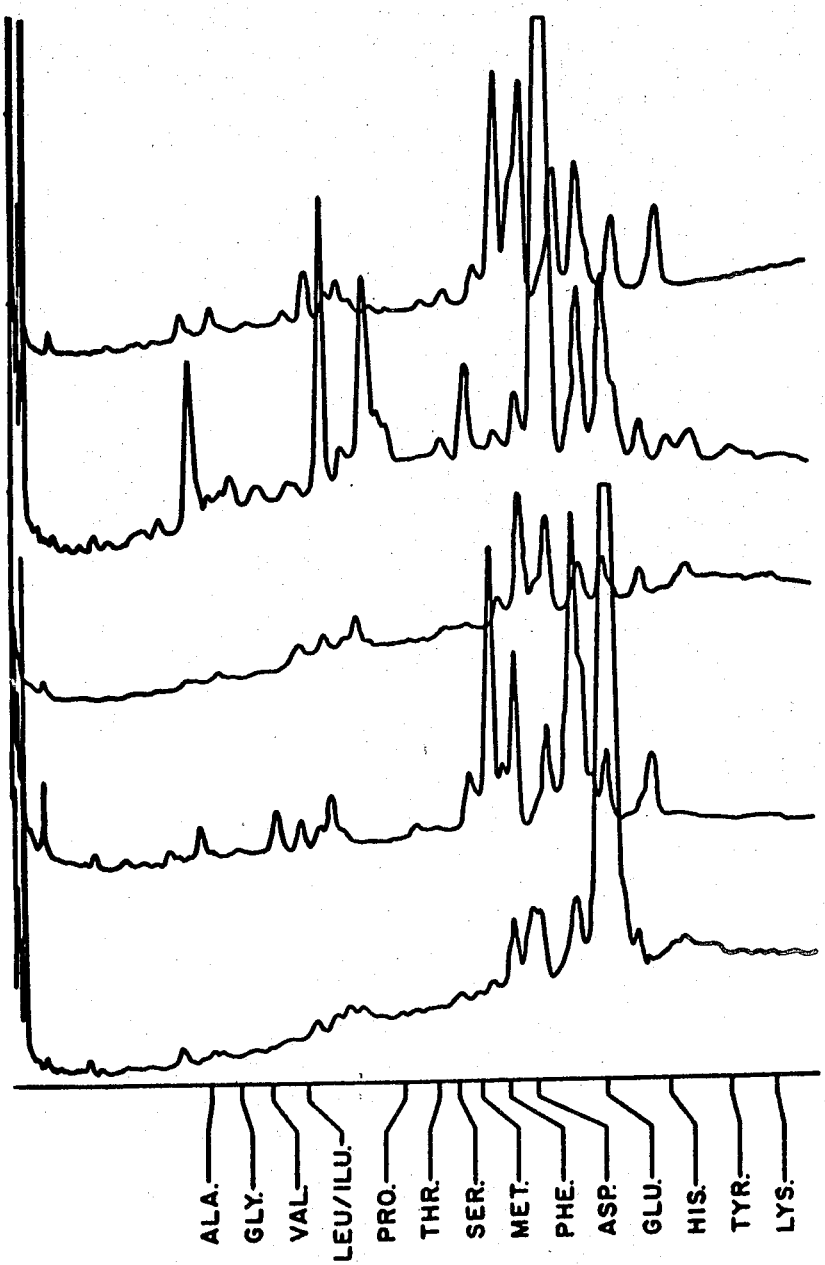

(2) Changes in metabolism related to growth rate: were observed by quantitative determination, performed by gas-liquid chromatography of the amino acid pools extracted from the cells of phased cultures growing at different cycle times. FIGS. 3A and 3B illustrate the results obtained using cells harvested at regular intervals from the top (i.e. 30 minutes and 90 minutes respectively) from phased cultures growing on the same medium, under identical conditions of growth, but at different growth rates (i.e. two hours and six hours thirty minutes respectively). The profiles, are tracings of the record charts of the analyses, and the areas under the respective peaks are a quantitative measure of the different components represented by the peaks. It can be seen that qualitative and quantitative changes occurred in the pools, that were different in the two cultures.

Figure 4:

(3) Changes in metabolism on different media were also observed by quantitative gas-liquid chromatography of the amino acid pools extracted from phased cultures grown at the same growth rate and under identical conditions, but on different media. FIG. 4 records the profiles obtained from samples taken at 90 minute intervals from the top of serial extracts of cells grown in phased culture, for a cycle time of 6 hours 30 minutes, in a medium in which the glucose had been replaced by glycerol (on an equal carbon basis); but otherwise under conditions of growth identical with those used in respect of FIGS. 3A–3B above. Comparison between FIGS. 3B and 4, which are analogous, showed that qualitative and quantitative changes occurred in the amino acid pool, and hence in the cell metabolism on different media.

The results from 1, 2 and 3 above show that a change in cell metabolism occurs over the cell cycle, and that this is related to growth rate, medium composition, or environment.

It will be seen from the quantitative traces of the aforesaid gas chromatograms FIGS. 3 and 4, that the different components of a pool change over the cycle and show great variation between themselves.

(III) Relationship between randomised and phased cultures

It is pertinent to compare the results obtained for the phased cultures obtained by the process of the present in-

TABLE V.—RESULTS OF PHASED GROWTH—GLYCEROL MEDIUM (4.25 HOUR CYCLE)

| Period in cycle (minutes) | 0 | 30 | 60 | 90 | 120 | 150 | 180 | 210 | 240 | 255 |
|---|---|---|---|---|---|---|---|---|---|---|
| O.D. (2/25) at 600 m$\mu$ | .33 | .36 | .39 | .41 | .45 | .48 | .50 | .53 | .57 | .60 |
| Dry wt. (mg./ml.) | 1.88 | 2.10 | 2.38 | 2.50 | 2.75 | 3.00 | 3.14 | 3.80 | 3.60 | |
| Total amino-ninhydrin (percent T) | 75.5 | 49.0 | 46.0 | 32.0 | 32.0 | 39.0 | 53.5 | 58.5 | 68.5 | |
| U.V. 260 m$\mu$—O.D. 1 ml. cell | .09 | .09 | .10 | .11 | .17 | .15 | .20 | .16 | .10 | |

| Period in cycle (minutes) | 0 | 50 | 100 | 150 | 200 |
|---|---|---|---|---|---|
| O.D. (2/25) at 600 m$\mu$: | | | | | |
| BW | .33 | .39 | .44 | .49 | .54 |
| FT | .33 | .39 | .44 | .49 | .54 |
| Total amino-ninhydrin (as percent T at 570 m$\mu$): | | | | | |
| BW | 69 | 36 | 34 | 42 | 25 |
| FT [1] | 47 | 39 | 23 | 25 | 35 |
| RNA (orcinol) as percent T 670/380 m$\mu$): | | | | | |
| BW | 38/66 | 4/66 | 19/42 | 23/50 | 50/73 |
| FT | 45/66 | 31/60 | 15/45 | 10/38 | 54/76 |
| DNA (diphenylanine) (as percent T 600 m$\mu$): | | | | | |
| BW | 43 | 48 | 64 | 60 | 58 |
| FT | 66 | 59 | 62 | 61 | 64 |
| Protein (Folin) mg./ml.: | | | | | |
| BW | 0.78 | 0.98 | 1.02 | 1.37 | 2.00 |
| FT | | | | | |

[1] Value as ½ BW concentration.
NOTE.—BW—boiled water extraction method; FT—freeze-thaw extraction method.

It will also be appreciated that these changes can be mapped over a cycle by a systematic and methodical compilation from the results of serial analyses during the cycle, so that optimal yield points (for example, as ratio of time interval elapsed in the cycle) may be charted for subsequent use in harvesting specific products.

A superficial inspection of FIG. 3B, for example, suggests that alanine might be harvested in maximal yield from the amino acid pool of cells undergoing phased growth under the conditions of that process at the time represented by the sample second from the top i.e. at ninety minutes after dosing.

While amino acid pools have been used as examples the same applied to other pools as will be seen from Table V which shows the results obtained by using the aforesaid glycerol medium with the C. utilis cell culture at a 4 hour 15 minute cycle time. The empirical totals of various cell constituents, given in Table V, show quantitative changes that reflect the qualitative changes evident in FIG. 2A–E; and in the following section 4, a further example, relating to nucleotide constituents, shows how the harvesting of specific products can be attained.

(4) When the 30 g./litre glucose was replaced by 30 g./litre glycerol in the nutrient medium given above, cells from a phased culture (4 hours 15 minutes cycle time) were extracted at 0° C. with 1.5 N perchloric acid after they had been chill washed with distilled water and their lipids removed by isopropanol. The filtrate was removed to a Dowex 50 column prepared after the method of Schlenk and DePalma, J. Biol. Chem. 229 1037, 1051 (1957). Elution of the nucleotides with 1 N $H_2SO_4$ was followed by washing until the effluent produced no significant reading at 256 m$\mu$. Subsequent chromatography of the extracts using an ethanol:water:acetic acid (65:32:1 v./v.) solvent system gave one spot of Rf 3.2 visible with ultra-violet at 260 m$\mu$ and with ninhydrin. It would appear the compound was that identified by Schlenk and DePalma as S-adenosyl methionine and from the data given in Table VI it was maximal just after the midpoint of the cycle.

TABLE VI.—PHASED GROWTH—S-ADENOSYL METHIONINE CONTENT

| Period in cycle (minutes) | 0 | 30 | 60 | 90 | 120 | 150 | 180 | 210 | 240 | 255 |
|---|---|---|---|---|---|---|---|---|---|---|
| O.D. (2/25)—600 m$\mu$ | .35 | .40 | .43 | .46 | .48 | .51 | .54 | .58 | .63 | .66 |
| 1N.$H_2SO_4$ eluate O.D. 256 m$\mu$ [1] | .09 | .08 | .10 | .11 | .17 | .15 | .21 | .16 | .11 | |
| 1N.$H_2SO_4$ washing O.D. 256 m$\mu$ | .02 | .01 | .02 | .01 | .01 | .01 | .01 | .02 | .01 | |
| 6N.$H_2SO_4$ eluate 256 m$\mu^2$ | .08 | .09 | .10 | .11 | .12 | .15 | .12 | .08 | .08 | |

[1] Nucleotide fraction. [2] S-adenosyl methionine fraction.

vention with the results obtained from equivalent cultures produced by the conventional continuous processing (i.e. cultures of the same growth rate but the cells randomised in the population).

In the phased cultures, single dimension chromatograms on paper of the amino acid pool (or of other pools) produce a pattern of spectral change over the cycle, which repeats every cycle. But if the serial extracts are combined an average pool over the cycle is obtained which yields an average spectrum characteristic for that cycle. A chromatogram of an amino acid pool on the glucose medium for a cycle time of four hours fifteen minutes with samples taken at twelve minute intervals and in chronological order is made in which the final sample is the average spectrum obtained from combining all of the others. This average sample characteristic of a randomised sample of phased cells having a doubling time equal to the cycle time of four hours fifteen minutes, should correspond to the spectrum obtained from a randomised culture of cells growing at the same doubling time in the same medium and under identical culture conditions, i.e. in a conventional chemostat operating with a retention time of six hours. (The doubling time ($D_T$) of cells growing in a chemostat, $D_T = B_T \log_e 2$ where $R_T$ is the retention time). The final sample is compared with chromatograms obtained from amino pools extracted from cells grown in the same glucose medium in chemostats at different retention times the residence time of cultures 1, 3, 4 and 5 being 5.0, 6.0, 7.0 and 4.0 hours respectively and culture 3 is the final sample mentioned above in FIG. 6A. It will be observed to coincide with that from a conventional chemostat of six hour retention time, i.e. with a culture having cells of a doubling time of four hours fifteen minutes.

This establishes the randomised and unrandomised chemostat relationship of the two systems, and the common basis of their operation (a) with respect to the cell, (b) with respect to the culture.

As the randomisation of a phased cell culture only occurs over several cycles the cell culture produced on completion of the processing cycle in the procesing unit is still in a phased condition and as such may also with advantage be analysed and investigated during a further cycle i.e. a post cycle, and suitable metabolites harvested during this post cycle. However, the nutrient medium at the end of the processing cycle will be essentially exhausted of at least one of the nutrients such as the nitrogen or carbon source, as the cell culture in the processing cycle and also the phasing cycle will have assumed a rate of growth consistent with the using up of a maximum amount of the nutrient which usually means that it will have used up the nutrient which is present in minimum quantity. Thus the cell culture in which the cell population has doubled and in which the cells are growing exponentially at the end of the processing cycle is confronted with an impoverished nutrient medium in which to develop and grow during the post cycle. Such further growth or development of the cells therefore can only occur at the expense of the unexhausted nutrients remaining in the nutrient medium and the extracellular and intracellular reserves formed by the cells and thus a different type of growth will occur. Thus in the processing and phasing cycles the metabolism occurring in the cells will be one of growth, i.e. primary growth whilst in the post cycle the metabolism will be one of development, i.e. secondary growth.

According to a further embodiment of the present invention there is provided a method for the continual production of a phased cell culture which comprises growing a phased cell culture in a nutrient medium at a predetermined rate of growth the quantity of the nutrient medium being sufficient only for the cells to complete their cycle, immediately prior to the doubling time of said culture adding a further amount of said nutrient medium so as to double the volume of the cell culture, at the doubling time dividing said cell culture into two equal halves whereby the cells in each of said halves may complete their cycle, continually repeating the process with one half of the cell culture, and allowing the other half of said cell culture to complete its cycle and proceed into the post cycle for further controlled development. Thus with this embodiment of the present invention it is possible to utilize or investigate the post growth development of the cell culture using phased cells which have had their growth rate controlled at a predetermined value. This allows a substantial improvement in terms of maximum metabolite concentration fluctuation over the known techniques using the conventional batch and continuous processes with randomized cells, avoids the necessity of temperature fluctuations and constraints due to filtration, separation, resuspension and similar manipulations. However such additional controls may be superimposed on the nutrient control, if desired, to maximize the desired metabolite concentration.

As has been indicated growth of the cell culture in the phasing and processing cycles is controlled primarily by limiting at least one of the nutrients present such as the nitrogen or carbon source, the other nutrients being present in the medium in non-limiting (excess) concentrations. Thus the amounts of the unexhausted nutrients in the nutrient medium at the start of the post cycle will depend upon the amount of these nutrients initially present in the fresh nutrient medium used in the phasing and processing cycles and as such the development which occurs in the post cycle will be controlled by this means. It follows therefore that some measure of control for the development of the cells in the post cycle can be achieved by the quantities of the non-limiting nutrients in the fresh nutrient medium used in the phasing and processing cycles. However the amounts of the non-limiting nutrients in the nutrient medium can be increased during the processing cycle without changing the rate of growth of the cells in this cycle by adding further quantities of these non-limiting nutrients at any time during the processing cycle, dependent upon experimental convenience, and in particular immediately prior to the commencement of the post cycle. The additions may be batch-wise or in a continuous basis as desired.

Thus systematic changes can be made in the amounts of the non-limiting nutrients in the nutrient medium while maintaining the amount of the limiting nutrient constant as the factor controlling the growth of the cells during their primary growth in the phasing and processing cycles. For example the amount of the nitrogen source in the nutrient medium in a carbon limited growth may be varied or vice versa. In this way changes or variations in the development of the cells in the culture in the post cycle can be made to follow a constant primary growth cycle. However other systematic variations or constraints can be superimposed on the post cycle as required such as temperature variation. In turn changes may be made in the primary growth in the phasing and processing cycles for instance by changing the doubling time, selecting different growth limiting factors or changing physical parameters such as temperature so that change in the development of the cells in the post cycle can be followed in cells grown at different growth rates and different environmental conditions.

This embodiment of the present invention using a post cycle development has particular application to the harvesting of metabolites from cell cultures which only produce the desire metabolites in the second growth, i.e. post cycle following the primary growth. Thus for instance in the production of pencillin with batch culture the penicillin is a secondary metabolite produced in the stage which follows the primary growth. In the phased culture process according to the present invention this metabolite may be harvested in the post cycle at the optimum time determined experimentally, and due to the phasing of the cell culture the yield is greatly increased over that of the randomized batch culture process.

According to a further embodiment of the present invention therefore there is provided a method of harvesting a desired metabolite from a phased cell culture which comprises growing a phased cell culture in a nutrient medium at a predetermined rate of growth the quantity of the nutrient medium being sufficient only for the cells to complete their cycle, immediately prior to the doubling time of said cell culture adding a further amount of said nutrient medium so as to double the volume of said cell culture, at the doubling time dividing said cell culture into two equal halves whereby the cells in each of said halves may complete their cycle, repeating the process with one of said halves to yield further phased cell culture, allowing the other half of said cell culture to complete its primary growth cycle and proceed into the post cycle for secondary growth and harvesting the desired metabolite from said post cycle culture at the time said metabolite is produced in optimum amount in said culture, said time having been predetermined by analysis of the metabolite production over previous post cycles of the phased cell culture.

Figure 5:
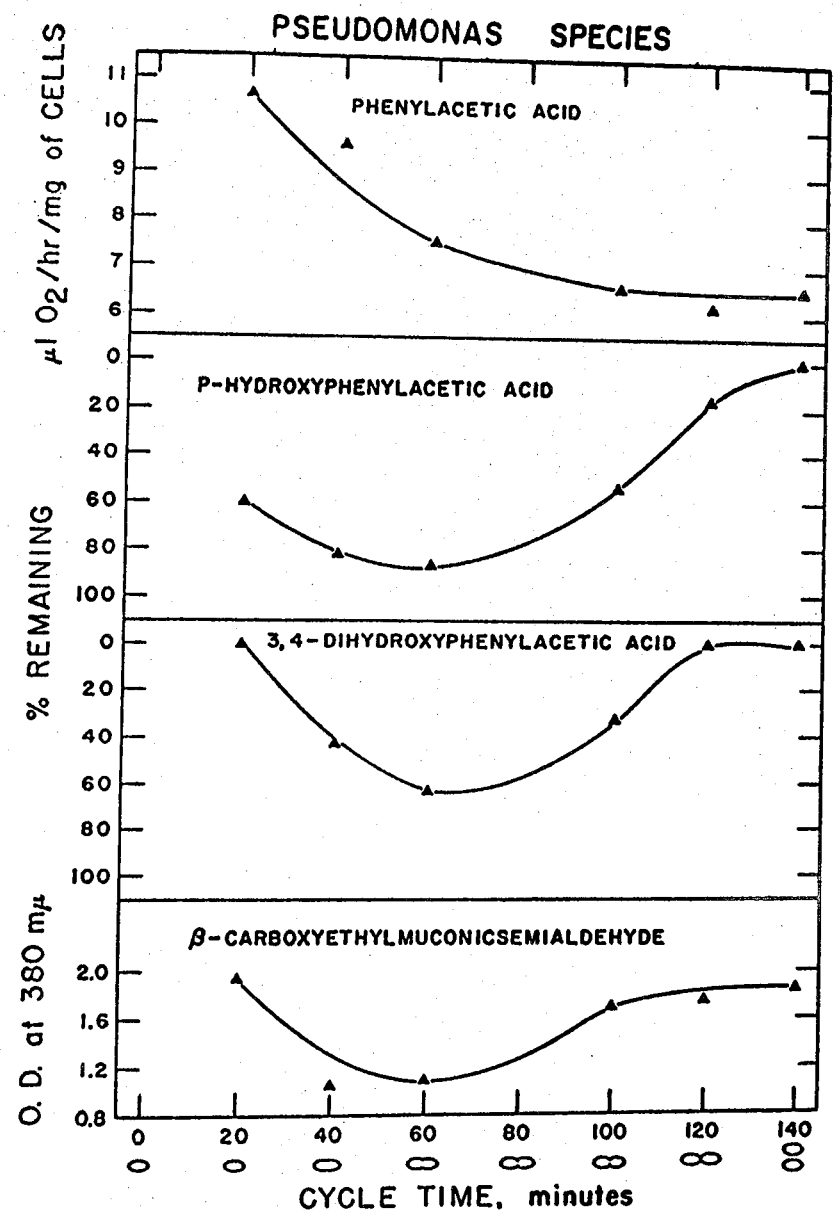

Further examples of the technique of this invention are provided by the studies summarized in FIGS. 5 and 6. In one of these studies the enzymes in a Pseudomonas species are used for aromatic breakdown of phenylacetic acid. During phased cultures it has been established that the activities of different enzymes, involved in the sequence of degradations, change during the cell cycle and undergo further variations with the growth rate, i.e. at different doubling times of the cells (see FIG. 5).

Similar variations in the behaviour of proteolytic enzymes of a Bacillus species have also been observed during the cell cycle and in the post cycle periods of phased cultures (see FIG. 6).

In these experiments with bacteria the different enzymes do not change together, but rise and fall in their activities at different periods in the cell and post cycles.

It can be seen from FIG. 6 that for short times harvesting should be made at the middle of the reproduction cycle. For longer times harvesting can be carried on well into the post cycle period.

What I claim as my invention is:

1. Apparatus for improving and maintaining the phasing of a cell culture comprising:
   a vertically oriented cyclone column culture vessel, said column including a conical funnel exit at the base and a cyclone inlet at the top;
   a recirculating limb comprising a conduit extending from the conical funnel exit at the base of said column to the cyclone inlet at the top thereof, said column and said limb together forming a circulation loop for circulation of a culture medium;

means for uniformly circulating the entire culture medium through said loop, said medium entering the top of said column, passing down the side walls thereof, and being withdrawn from the base thereof:

reservoir means for storing a supply of fresh culture medium nutrient;

dosing means for automatically intermittently introducing a predetermined dose volume of said nutrient into said loop, at predetermined intervals of time;

a collecting vessel; and outlet means for passing a volume of circulating culture medium from said loop to said collection vessel, said volume being sufficient to accommodate said predetermined volumes of nutrient introduced thereto at said predetermined intervals of time.

2. Apparatus according to claim 1 wherein said dosing means includes a vessel adapted to discharge the nutrient medium therefrom when said medium reaches a predetermined level therein.

3. Apparatus according to claim 1 wherein said dosing means comprises a syphon.

References Cited
UNITED STATES PATENTS

| | | | |
|---|---|---|---|
| 2,686,754 | 8/1954 | Monod | 195—143 |
| 2,822,319 | 2/1958 | Monod | 195—115 |
| 3,015,612 | 1/1962 | Pirt et al. | 195—115 |
| 3,172,235 | 3/1965 | Bjorklund | 195—115 |
| 3,252,870 | 5/1966 | Braun et al. | 195—115 |
| 3,402,104 | 9/1968 | Gore et al. | 195—115 |

ALVIN E. TANENHOLTZ, Primary Examiner

U.S. Cl. X.R.

195— 142, 143, 80, 1.8